J. Brooke,
Bedstead Fastening.
Nº 6,451.              Patented May 15, 1849.
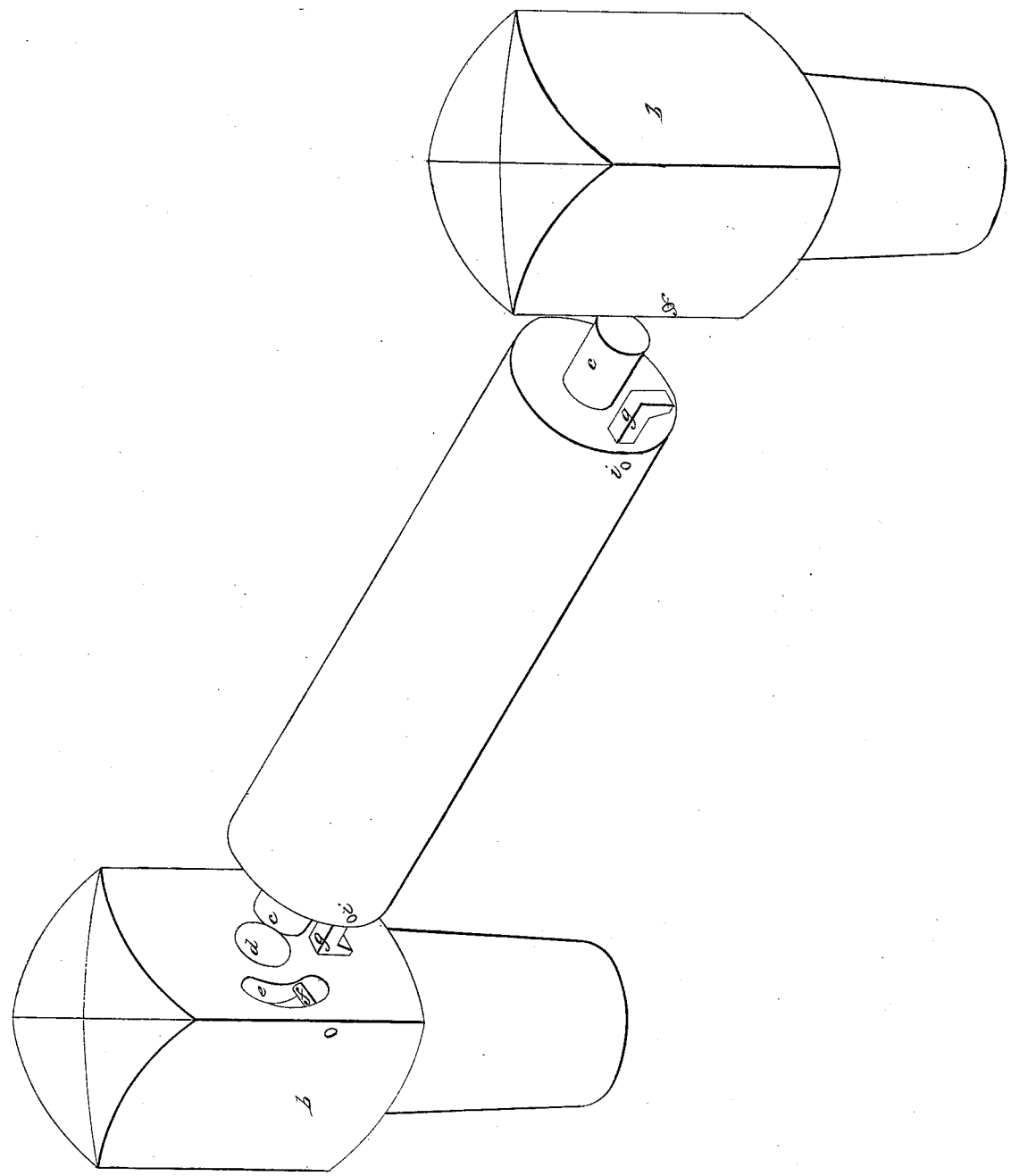

UNITED STATES PATENT OFFICE.

JAMES BROOKE, OF BALTIMORE, OHIO.

BEDSTEAD-FASTENING.

Specification of Letters Patent No. 6,451, dated May 15, 1849.

*To all whom it may concern:*

Be it known that I, JAMES BROOKE, of Baltimore, Fairfield county, Ohio, have invented new and useful Improvements in Bedstead-Fasteners; and I do hereby declare the following to be a full, clear, and exact description of the same, reference being had to the annexed drawings, making part of this specification, in which the foot-rail is shown with the fastener attached and the post with the concentric groove and the catch pin therein.

In these days when bedstead-fastenings have been so variously and cheaply constructed it would at first sight appear superfluous to attempt an invention in such a field. A close observation however will make it evident that this limited field has its indispensible points. A bedstead should be so constructed that at the same time that cheapness is regarded, due attention should also be given to its capability for withstanding wear and tear, to its firmness and oneness (that is as if made of one piece of wood when put together) to tightness and closeness in its joints and this last in two points of view, 1st the exclusion of bugs from these their usual nests and 2nd the mechanical accuracy and ease with which the parts can be manufactured and adapted to one another so that the greater the strain on the bedstead the tighter firmer and closer the rail will hug the post.

The nature of my invention consists in cutting a groove concentric with the circular mortise for the tenon of the rail, inserting a catch pin therein and attaching to the rail in the line of the curve of the concentric groove, when the tenon is applied to the mortise, a hook wedge-shaped next the rail and from point to butt so that as it is passed down behind and pressed upon the pin in the concentric groove, it draws the post tightly against the rail. By locating the fastener on the outside of the post and rail joint the bedstead is fully and completely protected from the destructive action of the strain most ordinarily put upon bedsteads; viz, dragging it round by the post.

(*a*) is the rail.
(*b*) is the post.
(*c*) is the cylindrical tenon on the rail.
(*d*) is the cylindrical mortise in the post.
(*e*) is the concentric groove.
(*f*) is the catch-pin, over which the fastener (*g*) passes and is wedged down behind by applying the rail to the post so that the fastener enters the top of the groove (*e*) and by turning the rail is made to dip its hook behind and be drawn tight carrying with it the rail to which it is attached by a pin (*i*).

It is obvious that the fastener can be put on the post and the groove and catch pin on the rail whereby the fasteners will be on the outside and accomplish the object of protecting the joint from the strain above mentioned. Besides this the fastener can be in several ways arranged in a perfectly analogous manner. And more than one may be used for each joint.

Having thus fully described my invention what I claim therein and desire to secure by Letters Patent is—

Fastening the post of a bedstead to the rail (or the rail to the post) by means of a hook, wedge-shaped from point to butt, next its attachment, and a groove having a catch-pin therein, which groove is concentric with the axis of the joint, substantially as described and set forth, whether placed at one or another point of the sweep of its circle; the hook being correspondingly attached.

JAMES BROOKE.

Attest:
  G. H. KNIGHT,
  THOS. G. CLINTON.